March 28, 1950            C. W. EARP            2,502,131

RADIO DIRECTION FINDER

Filed March 25, 1948            4 Sheets-Sheet 2

*Fig. 2.*

INVENTOR
CHARLES W. EARP
BY
ATTORNEY

March 28, 1950     C. W. EARP     2,502,131
RADIO DIRECTION FINDER

Filed March 25, 1948     4 Sheets-Sheet 3

INVENTOR
CHARLES W. EARP
BY
ATTORNEY

Patented Mar. 28, 1950

2,502,131

UNITED STATES PATENT OFFICE 2,502,131

RADIO DIRECTION FINDER

Charles William Earp, London, England, assignor to International Standard Electric Corporation, New York, N. Y., a corporation of Delaware Application March 25, 1948, Serial No. 17,007
In Great Britain March 20, 1947

12 Claims. (Cl. 343—113)

This invention relates to radio direction finders. More particularly, it relates to direction finders of the type in which the received wave is phase modulated at the receiver by commutative coupling of the latter to each in turn of a plurality of spaced receiving antennae, and the directional indication is obtained by phase comparison between a wave derived from the receiver wave, and a wave corresponding to the commutation cyclicity.

In the specification of co-pending application No. 608,956, filed August 4, 1945, there have been disclosed radio direction finder systems of the kind mentioned in which the antennae are commutatively coupled one at a time to a single receiving channel, the phase of the wave set up in said channel corresponding at any instant to the phase of the voltage induced in the antenna to which the receiving channel is coupled at that instant. Such systems give very satisfactory performance provided that the received signal i. e. the wave acting on the antennae, is of coherent radio frequency phase, meaning thereby that the phase of the wave is a continuous function of time and not subject to random changes during a cycle of commutation round the antenna system. In certain transmission systems, however, notably those based on the emission of short pulses of radio frequency energy, the phase of the radio wave is incoherent or subject to arbitrary changes occurring once or oftener during a commutation cycle, with the result that the phase modulation set up in the received wave by sequential coupling to one antenna at a time has no definite connection with the spatial distribution of the antennae, and is incapable of yielding directional information.

It is therefore a principal object of the present invention, to provide a direction finding system, of the type in which the directional information is obtained from a wave derived from phase modulation set up in the receiver by commutative coupling to respective antennae of an array which is effective independently of whether or not the received electromagnetic wave is characterised by coherency of the radio frequency phase.

A further object of the invention is to provide a commutated antenna direction finding system which can be operated over a wide waveband without changing the physical dimensions of the antenna lay-out.

According to its most general aspect the invention provides a radio direction finding system in which the received wave is phase modulated by commutative coupling of the receiver to each in turn of a plurality of spaced receiving antennae, the directional indication being obtained by phase comparison between a wave of the frequency of commutation derived from the received wave and a locally-generated wave of the same frequency, characterised in that means is provided for commutatively coupling two channels contemporaneously to different receiving antennae, means for combining the outputs of the two channels in such manner as to cancel out incoherent phase changes, and means for obtaining a directional indication by phase comparison between a wave derived from the said combined outputs a locally-generated wave of the frequency of commutation.

More particularly, the invention provides a radio direction finding system comprising a plurality of at least three antennae equally spaced round the circumference of a circle, two receiving channels, a source of oscillations of relatively low frequency F, means for energising each said receiving channel for substantially equal periods of time from each said antenna in cyclical progression round the array at said low frequency F, said two channels being contemporaneously energised by two different antennae separated by a predetermined spacing round the array, means for combining the outputs of said channels to yield a resultant wave the phase of which is modulated according to the phase difference between the said outputs, discriminator means to demodulate said resultant wave, means for selecting from the demodulation products a component of frequency F, means for comparing the phase of said selected component with the phase of a wave derived from said source of low frequency oscillations, and means responsive to the result of said phase comparison for indicating the direction of the received signal. For wideband operation the waveband to be covered may be divided into a number of sub-bands, the said plurality of antennae being at least twice the number of sub-bands, and the said predetermined spacing being different for each sub-band. Message intelligence may be received simultaneously with the directional information by the addition of a demodulation stage energised from one of said receiving channels.

A better understanding of the invention will be obtained from the following description of a preferred embodiment, taken in conjunction with the accompanying drawings, in which:

Fig. 2 illustrates in block form a receiver arrangement co-operative with the commutative system and antenna array of Fig. 1 and forming therewith an embodiment of the invention.

Figure 1:
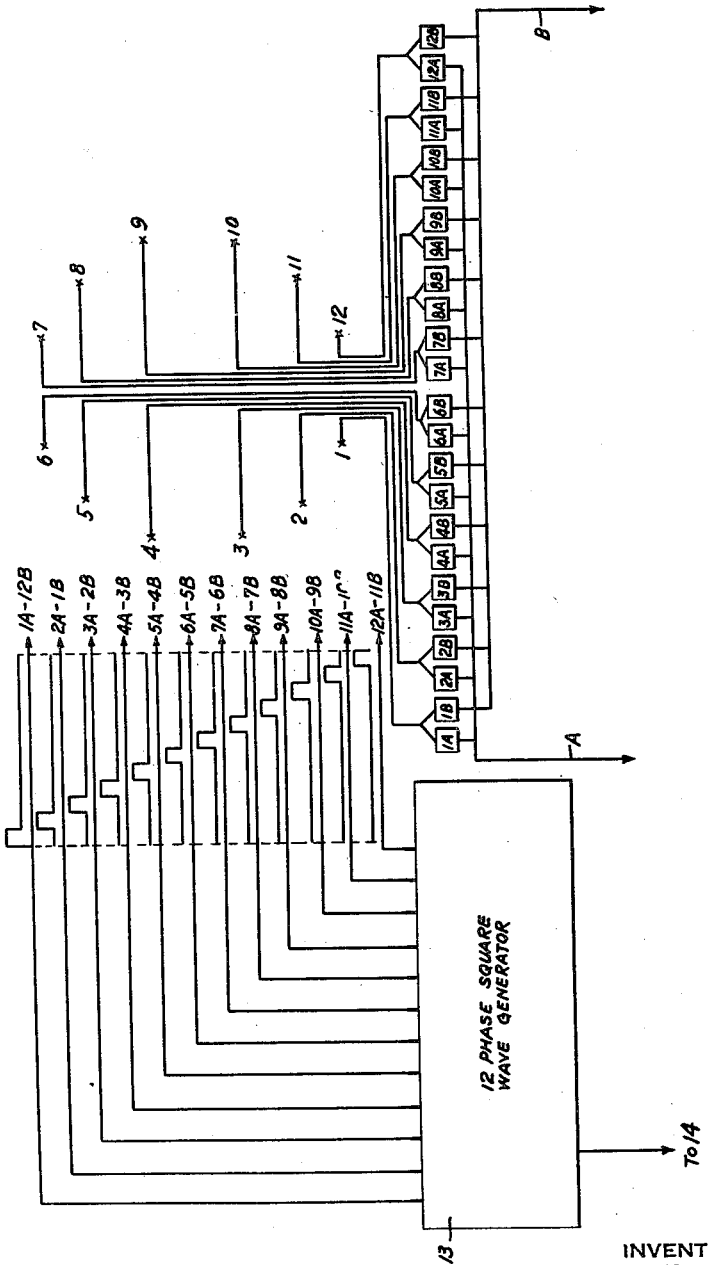
Fig. 1 illustrates in block form the commutation system used with a twelve-antenna array in an embodiment of the invention.

In reading this description it is to be understood that the term "frequency changer" means a modulator together with the filters required to isolate the wanted modulating product i. e. the upper or the lower set of sideband products, and to suppress all other output components. It is also to be understood that while in the drawings there are illustrated various amplifying stages, in actual construction such amplifying stages do not necessarily constitute separate units, and may be included in the preceding or in the following stage of operation, and indeed may in some cases not be necessary at all.

Referring now to Fig. 1, references 1, 2 ... 12 represent respective antennae of a 12 antenna circular array, the antennae being equally spaced around the circumference of a circle of diameter 40 metres, this diameter being four times the shortest wavelength which the system is intended to handle. In the present case this shortest wavelength is 10 metres (frequency 30 mc./s.), the longest wavelength which can be efficiently used being 300 metres (frequency 1 mc./s.). Associated with each antenna is a pair of amplifiers, references 1A and 1B, 2A and 2B ... 12A and 12B. These amplifiers, which for short wave operation are preferably of the inverted or grounded grid type, are grouped to energise two receiving channels A and B, the A receiving channel being energised by amplifiers 1A, 2A ... 12A, while the B channel is energised by amplifiers 1B, 2B ... 12B. All the amplifiers are normally blocked, but each amplifier is brought into an active or unblocked condition for a short period by the application of a substantially flat-topped pulse to a control grid, the said pulses being supplied at a relatively low frequency F by a 12-phase square wave generator reference 13. The respective phases of generator 13 are applied to unblock the amplifiers 1A, 2A ... 12A in succession in continuous cyclical order, so that the A channel is energised by each of antenna 1, 2 ... 12 in turn in each successive cycle of commutation. Similarly amplifiers 1B, 2B ... 12B are successively unblocked so that the B channel is energised by each of antenna 1, 2 ... 12 in turn in each of successive cycles of commutation. It is however arranged that at any given instant the A and B channels are connected to two different antennae separated by a predetermined spacing around the array; in the example illustrated in Fig. 1 this predetermined spacing amounts to the spacing of one antenna, so that the B channel lags behind the A channel by the duration of one pulse, and is energised by for example antenna 4 when the A channel is energised by antenna 3.

In Fig. 1 the amplifiers 1A, 1B ... 12A, 12B are shown as located outside the antenna array and connected by lines of different lengths. This showing has been adapted merely to simplify the diagram, and it is to be understood that in actual construction care must be taken to ensure that the propagation times inherent in the connections from each antenna to the point of commoning the amplifier outputs into the receiving channels are the same for all antennae. For example, if the amplifiers 1A, 1B ... 12A, 12B are located in a common centre, the transmission lines connecting the respective amplifiers to their associated antennae must be of equal lengths.

The 12-phase square wave generator 13 delivers in each phase pulses of repetition frequency F and of duration $\frac{1}{12}$F, the end of a pulse of one phase being followed immediately by the beginning of the pulse of the next phase, and may be of any convenient type such as a chain of multibrators controlled by a sine wave oscillator of frequency F. This oscillator forms part of the receiving and indicating equipment, and is illustrated in Fig. 2 as block 14.

Referring now to Fig. 2, which illustrates the receiving and indicating equipment used in conjunction with the commutated antenna and amplifier arrangement illustrated in Fig. 1, the outputs from the commutated antenna amplifiers 1A, 2A ... 12A are fed in common to a radio frequency amplifier 15A the output of which is converted to intermediate frequency $f$ which in the present example is 465 kc./s. in frequency changer 16A to which output from radio frequency beating oscillator 17 is also applied, the output of the frequency changer 16A being amplified in intermediate frequency amplifier 18A. Since the frequency changing process does not modify phase changes present in the inputs to the frequency changer, the output of intermediate frequency amplifier 18A is a wave characterised by frequency $f$ and instantaneous phase $\phi + \phi_A$ where $\phi_A$ is that element of the total phase angle which corresponds to the phase of the voltage induced in the antenna which is feeding channel A at that instant and $\phi$ is the remaining part of the total phase angle and includes the effect of phase changes inherent in the apparatus and in any instability of oscillator 17. In the same manner the outputs from the commutated antenna amplifiers 1B, 2B ... 12B are fed to a common radiofrequency amplifier 15B, beaten against oscillator 17 in frequency changer 16B to yield intermediate frequency $f$, and the intermediate frequency output from changer 16B is amplified in intermediate frequency amplifier 18B, the output of which is a wave characterised by frequency $f$ and instantaneous phase $\phi + \phi_B$, where $\phi_B$, is that element of the total phase angle which corresponds to the phase of the voltage induced in the antenna which is feeding channel B at that instant. The remaining part $\phi$ of the total phase angle is substantially the same as for the A channel, since the apparatus phase changes are similar in the units 15A and 15B, 16A and 16B, 18A and 18B, and the same beating oscillator 17 is used in both cases, and any phase instability in this oscillator or in the transmitter will affect both channels simultaneously and to the same extent.

The output for intermediate frequency amplifier 18B is now fed to frequency changer 19 to which is also applied output from a highly stabilised, as by crystal control, oscillator 20 operating at frequency $F_1$, which may be of the order to 100 kc./s. The output from changer 19 corresponds for example to the summation beat between the two inputs, and is amplified in amplifier 21, the output of which is a wave characterised by the summation both in frequency and phase of the waves applied to changer 19, i. e. a wave of frequency $f + F_1$ and of phase $\phi + \phi_B + \phi_c$ where $\phi_c$ is the phase of oscillator 20. This output is applied to frequency changer 22, to which is also applied the output of intermediate frequency amplifier 18A, and the difference frequency product is selected. Since the input from amplifier 21 has frequency $f+F_1$ and phase $\phi+\phi_B+\phi_c$, while the input from amplifier 18A has frequency $f$ and phase $\phi+\phi_A$, the difference frequency product has frequency $F_1$ and phase $\phi_B-\phi_A+\phi_c$, i. e. it is a wave of the same fixed frequency $F_1$ as oscillator 20, and of instantaneous phase corresponding to the difference between the instantaneous phases of channels A and B. This output from frequency changer 22 is amplified in a final amplifier 23 and then applied to a frequency discriminator 24, which can be made highly sensitive since it has to operate only over a narrow band centred on the frequency $F_1$ of the stabilised oscillator 20. The output circuit of discriminator 24 includes a filter which selects an output product of the same frequency F as the frequency of commutation, and this product is applied, after amplification in selective amplifier 25, to phase comparison device 26, where it is compared against another wave of the same frequency F supplied from control oscillator 14 through phase adjuster 27, the result of the comparison being displayed as a signal bearing indication on a cathode ray oscillograph in accordance with technique already well known in the art, phase adjuster 27 being used to set the "zero" or reference azimuth bearing.

For the purpose of receiving message intelligence in addition to functioning as a direction-finding system, the equipment includes a detector and low frequency amplifier and loud speaker or other message-reproducer, represented collectively in Fig. 2 as block 28, is energised from only one of the two receiver channels, in the present instance the A channel.

In operation, the signal set up in the A channel by a distant transmitter is phase modulated in steps by the cyclically commutative energisation of the channel from each of the spaced antennae in turn, the depth of the modulation being fixed by the diameter of the antenna system (as measured in wavelengths), the fundamental frequency of the stepped phase modulation wave being the frequency of commutation F, and the phase of the modulation wave relative to the phase of commutation being determined by the direction of propagation of the received wave. For a detailed explanation of the relationship between the phase modulation wave and the commutation cycle reference may be made to the specification of co-pending application No. 608,956, filed August 4, 1945. In the B channel a similar phase modulation of the received signal is set up, having the same depth and frequency of modulation as in the A channel, but differing in phase since for the B channel the progressive energisation from different antennae round the array is dephased relative to that for the A channel, the amount of dephasing corresponding to the difference between the numbering of the two antennae connected respectively at any instant to the A and the B channels, multiplied by 360° divided by the total number of antennae in the array. Representing each wave of phase modulation as a vector, it will be evident that the difference between the two waves of modulation is another wave of phase modulation having the same fundamental frequency as that of either channel, and in quadrature with phase intermediate between the phases of the modulation of the two channels, and therefore containing the directional information imparted by the commutation process. Since however, this "difference" wave of phase modulation is determined by the instantaneous energisation from successive pairs of antennae instead of by sequential energisation from each of a series of antennae, it will remain constant for a given direction of propagation even if the transmitted wave is of incoherent phase, for any erratic changes in the phase of the transmitted wave will affect both A and B channels simultaneously and cancel out in the difference wave. The system of the present invention is therefore particularly suitable for direction-finding on transmissions of incoherent phase, such as pulse transmissions, and is of course also suitable for transmissions of coherent phase. This "difference" wave of phase modulation appears at the output of frequency changer 22 as a phase modulation of a wave of constant frequency $F_1$ irrespective of the value of the radio and intermediate frequencies, and is extracted by the discriminator 24, the component of fundamental frequency F being selected by filter or tuning means contained in selective amplifier 25. Phase comparison between this selected wave and a wave of the same frequency supplied by the control oscillator 14 yields the required directional information, phase adjuster 27 being used to set the "zero" or reference direction on the bearing indicator, this adjustment taking into account any differential phase shifts which may occur in the A and B channels prior to their combination in frequency changer 22. No connection is necessary for phase changes in the beating oscillator 17 or the stabilised oscillator 20, as such changes either do not appear in the difference wave or do not consistently vary at the commutation frequency F.

While the value of the commutation and comparison frequency F is not critical, it should be at least sufficiently high to ensure that the shortest duration telegraph signal element of a keyed continuous wave transmission includes at least one complete cycle of commutation round the antenna array. Preferably, it should be above the highest frequency used by whatever intelligence modulation is applied at the transmitter and is to be extracted by the message detector unit 28, Fig. 2. For example, if the transmitted wave is speech modulated using a frequency band extending up to 3000 c./s., the commutation frequency may conveniently be made about 4000 c./s., in which case the commutation will produce negligible interference with the reception of speech, and station identification and traffic working may be carried on simultaneously with direction finding.

The frequency $F_1$ of the stabilised oscillator 20 is chosen with regard to the intermediate frequency $f$, but is not critical, it may conveniently be of the order of one-fifth the intermediate frequency. The intermediate frequency itself will be governed by the frequency band over which it is desired to operate, and chosen in accordance with well known superheterodyne receiver technique. It will be understood that while in the embodiment illustrated in Fig. 2 there is shown only one step of frequency changing in each channel to convert the received carrier to intermediate frequency $f$, this conversion may if convenient be carried out in two or more steps, on condition that in any one step both channels are beaten down in frequency by the same beating oscillator so that no differential phase shifts are imposed on the channels. It will further be obvious that in certain cases, more particularly when the transmitted frequency is low, the production of an intermediate frequency wave in each channel may be unnecessary; in such cases the A channel from the antenna-amplifier system would be fed direct to frequency changer 22, while the B channel would be fed direct to frequency changer 19.

One of the main limitations in achieving very wide band operation with the type of phase direction finding systems formerly described is that at wavelengths which are small compared to the spacing between adjacent antennae only a slight phase modulation of the signal is achieved with a consequent loss of gain.

In the present system, however, when the wavelength falls to a value such that the amplitude of the fundamental component F of the discriminator output is insufficiently large to provide satisfactory operation, it is possible by means of a redistribution of the pulses controlling the inverted amplifiers, to arrange that the phase modulation of the final I. F. train is dependent on the original R. F. phase difference between the pickups of antennae which are not necessarily adjacent, and which, because of the greater spacial separation thereby involved, impose a larger degree of phase modulation on the signal.

The most logical step from the comparison of the outputs from antennae 2 and 1, 3 and 2 etc., is to compare those from 3 and 1, 4 and 2 etc. but a slight practical difficulty is here encountered since the whole bearing scale is thereby rotated by 15° (i. e. half the angular spacing between adjacent antennae) from its former position when adjacent antenna comparison was being used. This may be overcome by introducing an appropriate change in the phase adjuster 27 thereby causing a counterrotation of the bearing scale of the correct amount, but to avoid this complexity the comparison of the outputs from antennae 2 and 1, 3 and 2 etc., gives place at the low frequencies to the comparison of those from 3 and 12, 4 and 1, etc. and at still lower frequencies 4 and 11, 5 and 12 etc., so that for a given phase of commutation the mean phase of the two active antennae remains constant.

The normal type of discriminator law is a sinusoidal relationship between amplitude of D. C. output and sudden change of H. F. phase, and thus changes of phase of 90° produce a maximum positive output whilst greater changes produce smaller outputs until for 180° the output is zero, for 270° a negative maximum is obtained, and for changes of between 360° and 540° the output is again positive and so on.

Figure 3:
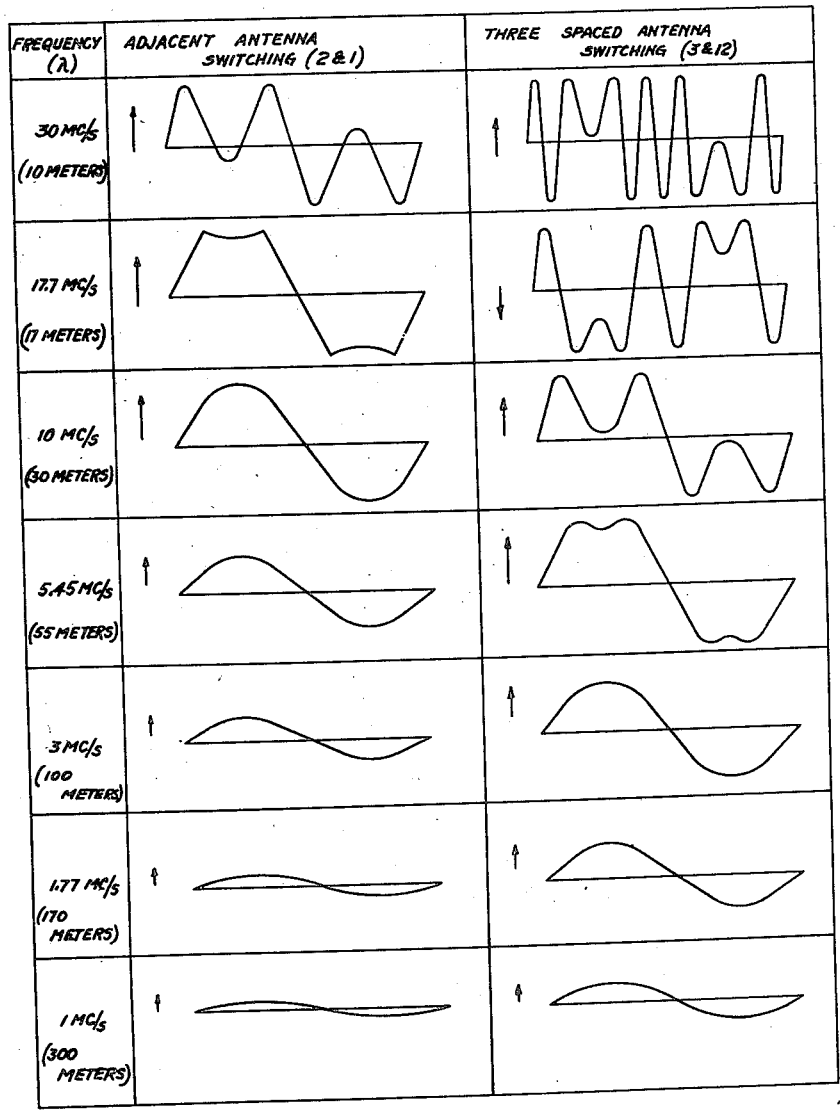
Figs. 3 and 4 are drawings used in explaining the operation of the embodiment of the invention illustrated in Figs. 1 and 2.
Figure 4:
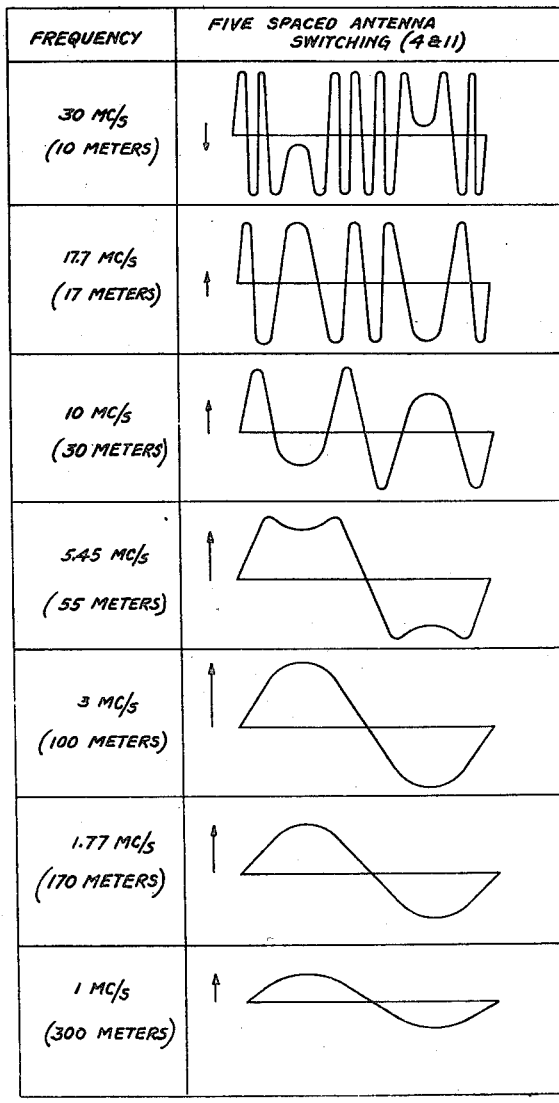

Figs. 3 and 4 show the time graphs of the discriminator outputs, of a twelve antenna double switched phase direction finding short wave system having an aperture of 40 metres or 4λ at 30 mc./s. for adjacent, three-space and five-space antenna switching (i. e. arcuate spacings of 30°, 90°, and 150°) for frequencies from 1 to 30 mc./s. The magnitude of the fundamental component F of the output wave is shown in each case as a vector. It will be seen that between 30 and 10 mc./s. adjacent antenna switching (Fig. 3) produces a strong fundamental whilst at the lower frequencies the amplitude of that component becomes too small for the effective operation of the system. The three-spaced antenna switching is most beneficial in the band 10 to 3 mc./s., causing over-modulation at higher frequencies and insufficient modulation at lower frequencies (Fig. 3). By using the five-spaced antenna type of switching which causes high over-modulation above 6 mc./s. (Fig. 4), the lowest part of the band, from 3 to 1 mc./s. is effectively covered— the fundamental component of the discriminator output having, at 1 mc./s. over four times the amplitude of the corresponding output obtained with adjacent antenna switching.

As the wavebands of the normal type of short wave receiver progress in steps of frequency of ratio 3:1, it will be seen that with the particular frequency coverages for the various types of switching discussed, progression from adjacent to three-spaced and from three-spaced to five-spaced switching can be achieved as the 30–10 to 10–3 mc./s. and the 10–3 to 3–1 mc. band switching of the receiver is performed.

What is claimed is:

1. A radio direction finding system comprising an array including a plurality of at least three antennae equally spaced round the circumference of a circle, two receiving channels, a source of oscillations of relatively low frequency F, means for energizing each said receiving channel for substantially equal periods of time from each said antenna in cyclical progression round the array at said low frequency F, said two channels being contemporaneously energised by two different antennae separated by a predetermined spacing round the array, means for combining the outputs of said channels to yield a resultant wave the phase of which is modulated according to the phase difference between the said outputs, discriminator means to demodulate said resultant wave, means for selecting from the demodulation products a component of frequency F, means for comparing the phase of said selected component with the phase of a wave derived from said source of low frequency oscillations, and means responsive to the result of said phase comparison for indicating the direction of the received signal.

2. A direction finding system according to claim 1, in which each said antenna is coupled to the input circuits of a corresponding pair of normally blocked amplifiers, one amplifier of each said pair having its output circuit coupled to one of said receiving channels, the other amplifier of each said pair having its output circuit connected to the other said receiving channel, and in which commutative means responsive to said source of oscillations of frequency F is adapted to unblock said amplifiers successively and cyclically two at a time for said equal periods of time whereby to energise said receiving channels from said antennae.

3. A direction finding system according to claim 2, wherein said commutative means comprises an N-phase pulse generator, where N is the number of said antennae, the pulse repetition frequency being equal to that of and controlled by said source of oscillations of frequency F, the pulse duration being substantially equal to 1/FN, and means for applying unblocking pulses from each output-phase of said generator to a different two of said amplifiers.

4. A direction finding system according to claim 1 in which the means for combining the outputs of said two receiving channels comprises a beating oscillator, first frequency changing means to which are applied output from said beating oscillator and from one of said receiving channels and which yields an output wave of frequency corresponding to the sum (or difference) of the input frequencies, and second frequency changing means to which are applied output from the other said receiving channel and output from said first frequency changer and which yields a resultant wave of frequency corresponding to the difference between the input frequencies.

5. A direction finding system according to claim 4, comprising means for highly stabilizing said beating oscillator.

6. A direction finding system according to claim 5 in which the frequency of said beating oscillator is substantially one fifth of the frequency of the receiving channel output applied to said first frequency changer.

7. A wide-band radio direction finding system according to claim 1 wherein the waveband to be covered is divided into a plurality of sub-bands, the said plurality of antennae being at least twice the number of sub-bands, and the said predetermined spacing being different for each sub-band.

8. A wide-band radio direction finding system according to claim 7, covering a waveband having a maximum to minimum ratio of 30, wherein said antennae are 12 in number and are equally spaced round a circle of diameter four times the minimum wavelength, and said waveband is divided into three sub-bands with predetermined arcuate spacings of 30°, 90°, and 150° respectively.

9. A radio direction-finding system according to claim 8 in which phase adjusting means is provided intermediate said phase comparison means and the source of one of the waves to be phase-compared, for the purpose of setting the azimuthal zero of the directional indication.

10. A direction finding system according to claim 9 further comprising means for receiving message intelligence, said means comprising a demodulator energised by one of said receiving channels and yielding said message intelligence.

11. A direction finding system according to claim 10, in which the frequency F of said source of oscillations is at least as great as the highest component frequency in said message channel.

12. A direction finding system according to claim 11, in which said demodulator stage includes filter means to exclude from the demodulator output all components of frequency not less than the frequency of said source of oscillations.

CHARLES WILLIAM EARP.

REFERENCES CITED

The following references are of record in the file of this patent:

UNITED STATES PATENTS

| Number | Name | Date |
|---|---|---|
| 2,393,353 | Wirkler | Jan. 22, 1946 |
| 2,411,518 | Busignies | Nov. 26, 1946 |
| 2,444,425 | Busignies | July 6, 1948 |